April 2, 1935.  O. JANSSEN  1,996,156
DISPENSING APPARATUS
Filed Feb. 23, 1932   3 Sheets-Sheet 1

April 2, 1935.  O. JANSSEN  1,996,156
DISPENSING APPARATUS
Filed Feb. 23, 1932   3 Sheets-Sheet 2

April 2, 1935. O. JANSSEN 1,996,156

DISPENSING APPARATUS

Filed Feb. 23, 1932 3 Sheets-Sheet 3

Oscar Janssen, Inventor.

Patented Apr. 2, 1935

1,996,156

UNITED STATES PATENT OFFICE 1,996,156

DISPENSING APPARATUS

Oscar Janssen, St. Louis, Mo.

Application February 23, 1932, Serial No. 594,611

3 Claims. (Cl. 221—60)

This invention relates to dispensing apparatus, and with regard to certain more specific features, to an improved dispensing means, preferably for flexible tubes or the like.

Among the several objects of the invention may be noted the provision of a closure and dispensing means for an outlet, which is an improvement over the means set forth and described in my United States patent application filed September 29, 1930, Serial No. 484,970, patented as No. 1,845,918; the provision of a combination of positive closing means and a dispensing means of the class described which gives the user the choice of using the positive closing means with or without said dispensing means and vice versa. Another object is to provide a closure of this class which more effectively retains oily and similar materials during shipment and use. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention, Fig. 1 is a vertical sectional view of one modification of the invention showing a dispensing means joined to an outlet of a flexible tube;

Similar reference characters indicate corresponding parts throughout the several views of the drawings.

Figure 1:
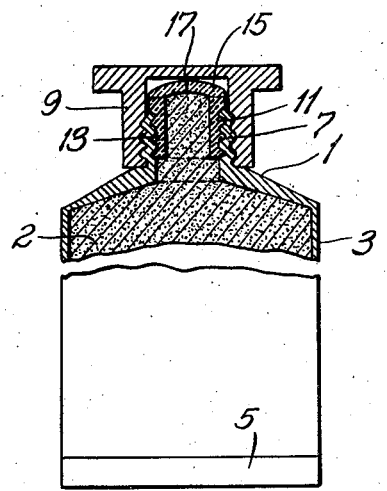

As more particularly described in said prior patent application and shown herein, there is effected dispensing means comprising a rubber tip 15 (Fig. 1 herein) having an outlet 17. The purpose of such a tip 15 is to dispense material such as paste 2 from flexible tubing 3 or the like. The outlet 17 opens under pressure of the material 2, in the tubing to dispense the material and then closes, when said pressure ceases, to cut off the ribbon or strip of material exuded. Thus, if the material is exuded onto a tooth brush, as the stroke is finished, the tip 15 may be applied to the brush to clean the tip, or if the tip is not applied to the brush, it may readily be held under a stream of running water or otherwise easily wiped off. The closing of the outlet 17 of the tip 15 leaves an air-tight seal between the interior and exterior of the tube.

Thus the necessity of the ordinary type of screw cap is eliminated on flexible tubes 3 in instances where the tube 3 is not subjected to inadvertent exterior pressure which would cause unintentional exudation of material from the tube 3. There are, however, certain users of material put up in such tubes 3 who at times would of necessity subject the tube 3 to inadvertent pressures. For instance, travelers in packing a tube 3 might subject it to pressures. In order to avoid the necessity of stores carrying different types of tubing 3 for such users, I have provided a combination of cap and dispensing means or tip 15 with which the use of the cap with or without the tip 15 and vice versa, is at the option of the user. In this way all customers are satisfied by the same combination. I have further found that various shapes in the slits of said tips 15 effect certain advantages.

Referring now more particularly to Fig. 1, there is illustrated at numeral 1 a top portion of a compressible or flexible tube 3. The tube 3 is provided with a closed seam 5 and is composed of lead or the like so that it may be manually compressed, after having been filled, to exude material 2 therefrom. This class of tube is known and further description herein is unnecessary.

Figure 12:
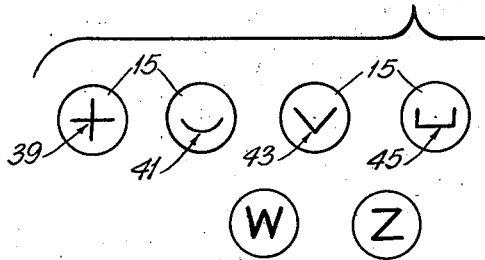
Fig. 12 is a diagrammatic view illustrating various shapes of outlets of the dispensing means.

The top portion 1 of the tube 3 has an outlet 7. In this modification the outlet 7 is threaded both externally and internally. The internal threads threadably receive a nozzle 11 which comprises a bushing 13 formed from hard rubber, bakelite, or other suitable material. A diaphragm or dispensing means 15, such as rubber, covers the outer end of said bushing. The nozzle 11 extends appreciably above the outlet to provide a grip to remove it from the outlet 7 by unthreading therefrom. The diaphragm 15 comprising the end of the bushing 13 has an outlet 17 cut therein which is preferably preformed by entering a thin blade into the rubber. As shown in Fig. 12 this outlet or slit 17 may assume various shapes and advantages of certain shapes will be pointed out hereinafter.

The exterior threads of the outlet are adapted to threadedly receive a cap 9 formed from metal. The cap 9 is used for projecting the rubber tip during shipment, or in place of or with the rubber tip 15 as is desired by the user. It is to be understood that the cap 9 may be formed from hard rubber or bakelite rather than from metal. Thus the cap 9 may be used as an ordinary screw cap in the event that the user has a special reason for removing the nozzle 11 by threading it out of the outlet 7. The user may prefer to use both the tip 15 and cap 9 together.

In the following modifications similar reference characters will be used to indicate parts which are similar to parts shown in Fig. 1.

Figure 2:
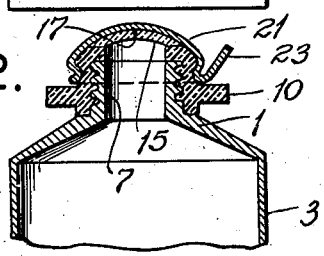
Fig. 2 is a view similar to Fig. 1, but showing a dispensing means applied to a cap of the flexible tube.

A modified form of the invention is shown in Fig. 2, wherein the outlet 7 is exteriorly threaded and provided with an interiorly threaded collar 10 of rigid material such as hard rubber or bakelite or the like. The collar 10 has an opening in its top which is covered by a slitted, elastic diaphragm 15 which is similar to that described in connection with Fig. 1. The slit of the diaphragm 15 is indicated at numeral 17. The diaphragm 15 is joined to the collar 10 by a suitable adhesive or by vulcanizing it thereon. It forms an outer tip or closure for the collar. A thin metal or celluloid cover 21 is crimped on the collar 10 and extends over the diaphragm 15. This cover 21 may also be formed of gelatin. The cover 21 positively seals the device by preventing the opening 17 of the diaphragm 15 from exuding material. The assembly of the collar 10, diaphragm 15 and cover 21 constitute a screw cap. However, by pulling or pushing the cover 21 from the collar 10 by means of a handle or extension 23, the diaphragm 15 is exposed and may be forced open at slit 17 under pressure of the material within the tube 3, similar to the operation described in the modification shown in Fig. 1. It is to be noted that in Fig. 2, the outlet 7 has no nozzle 11 and that the collar 10 may be used as a positive seal and as an ordinary screw cap only while the cover 21 is in place thereon.

Figure 4:
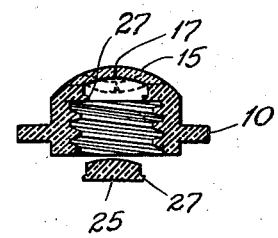
Fig. 4 is a view showing a portion of the cap of Fig. 3 removed.
Figure 3:
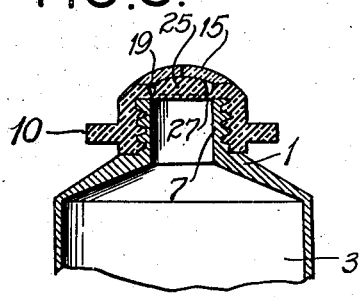
Fig. 3 is a view similar to Fig. 2 showing another embodiment of the invention.

In the Fig. 3 modification, as in the Fig. 2 modification, the diaphragm 15 is joined to and forms the top of the collar 10 rather than being separately positioned in the outlet or nozzle 7. Further, in this modification the collar 10 has an annular groove 19 around the top, leaving a thin web of material 27 to hold an integral center plug 25 in place. Thus the collar 10 with the elements 15 and 25 per se is shipped intact, and may be used as an ordinary screw cap. If, however, the user desires to use the diaphragm 15 as hereinbefore described, it is only necessary to apply pressure upon the rubber tip 15 whereby the plug 25 is broken out. The breakable web portion 27, retaining the plug 25, is thin enough to allow the plug 25 to be broken out with pressure of the fingers. Fig. 4 shows the plug 25 broken out, and the dotted line position of the diaphragm 15 shows how it is pushed down to push the plug 25 out.

Figure 5:
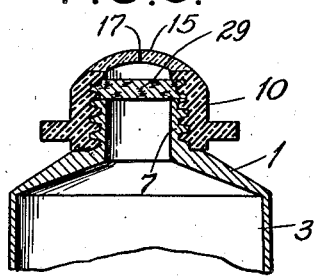
Figs. 5 to 11 are views similar to Fig. 2 showing other embodiments of the invention.

In the modification shown in Fig. 5, as in Fig. 2 the diaphragm 15 is formed with the collar 10 rather than being joined to the outlet 7. In this modification, however, the collar 10 is sealed for shipment, and for use as an ordinary screw cap by means of a plug 29 formed from cork or like material and held in position in the collar 10 by means of the threads of the collar. The plug 29 thus positioned prevents the escape of any material in the tube 3 but may be removed in order that the rubber tip or diaphragm 15 may be used as a dispensing medium for the material in the tube 3. The plug 29 is removed by first removing the collar 10 and then punching the plug 29 out through the threaded portion of the collar 10 by means of an object pushed through the slit 17 in the rubber tip or diaphragm 15.

Figure 6:
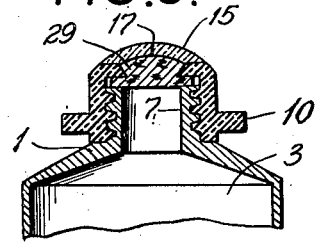
Figure 7:
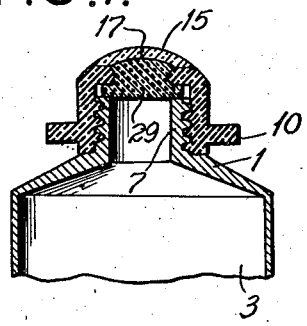

In the modifications as shown in Figs. 6 and 7, a plug similar to the plug 29 of Fig. 5 is used to seal the device during shipping and when the collar is used as an ordinary screw cap, but in these modifications the plugs 29, rather than being held at the top of the collars 10 by means of the threads of the collars, are held in place by extending flange portions of the collar 10 and plugs 29 which interlock with each other. As before, in order to remove the plugs 29 from the collars 10 an object is inserted through the slit 17 in the respective diaphragm 15 and the plugs 29 pushed from the collars 10 while the collars are removed from the outlets 7. In Fig. 7 the plug 29 is shown as being formed from rubber, although it may be formed from cork or the like.

Figure 8:
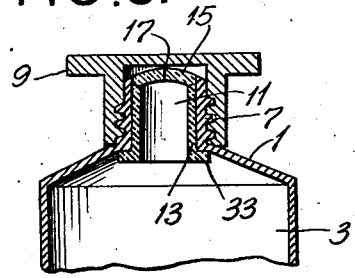

The modification shown in Fig. 8 resembles the modification of Fig. 1, except for the fact that the bushing part 13 of the nozzle 11 instead of being threaded to the outlet 7 is held in place by means of a flange 33. In this instance the nozzle 11 is inserted in the outlet 7 prior to the filling of the tube with material 2. The bushing 13 has a tip 15 covering its upper end and joined thereto by a suitable adhesive or by vulcanizing it thereto. The cap 9, as in the other modification, may be formed from hard rubber, bakelite, metal or like materials.

Figure 9:
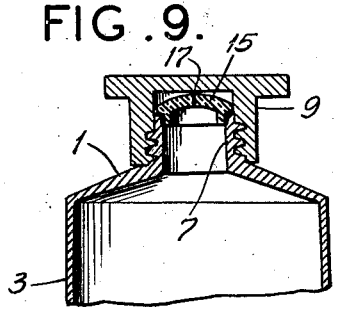
Figure 10:
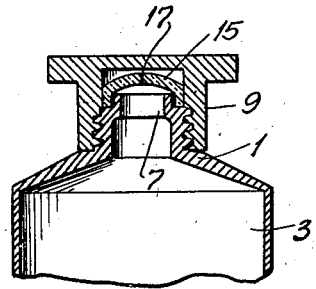

In the modifications of Figs. 9 and 10, the diaphragm is secured to the outlet 7. The cap 9 may be used as desired, such as when the tubes 3 are shipped, or as when later the user travels with the tubes 3 which are then subjected to pressures. The difference between the modifications of Figs. 9 and 10 is primarily in that in Fig. 9 the diaphragm is interiorly joined to the outlet 7 and in the Fig. 10 modification the diaphragm is exteriorly joined thereto.

Figure 11:
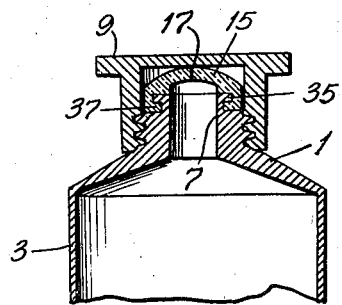

In the modification shown in Fig. 11, the diaphragm 15 is secured to the outlet 7 by a key between flanges 35 and 37 formed on the outlet 7 and the diaphragm 15 respectively. The rubber diaphragm 15 is applied to the outlet 7 by stretching its flange 37 over the flange 35 of the outlet 7, and is thus retained on the outlet 7. The diaphragm 15 may be cemented to the outlet 7, but if it is not cemented thereon it is easily removable in the event the user does not elect to use it. Likewise the use of the cap 9 is optional with the user.

Figure 13:
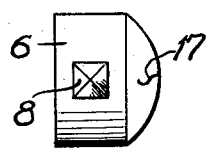
Fig. 13 is a plan view of an alternative form of cap.
Figure 14:
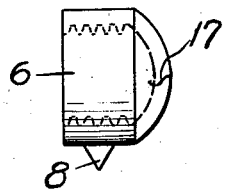
Fig. 14 is a side elevation of Fig. 13.
Figure 15:
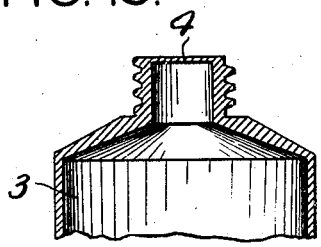
Fig. 15 is a cross section of the tube with which the cap of Figs. 13 and 14 is to be associated.

In Figs. 13 to 15 is shown a form of the invention in which the end of the tube has formed integrally thereover a thin, soft-metal diaphragm 4 which lies under the cap 6 (Figs. 13 and 14) when the cap is applied. The cap 6 is provided with a sideward lug 8 which is adapted to push through the diaphragm 4 and ream out the same. Thus the material is positively held in during shipment, and after the customer receives it, may be exuded after breaking the diaphragm 4 by means of the reamer 8.

Figure 16:
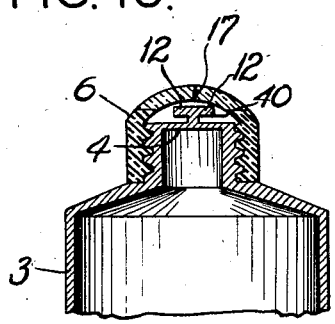
Fig. 16 is a cross section showing another form of the invention.

Or, the diaphragm 4 may be provided with a knob 40, as shown in Fig. 16, by means of which the customer may break the diaphragm 4. As shown in Fig. 16, the knob has extensions 12 for permitting better gripping thereof for twisting or tearing open the diaphragm.

Figure 17:
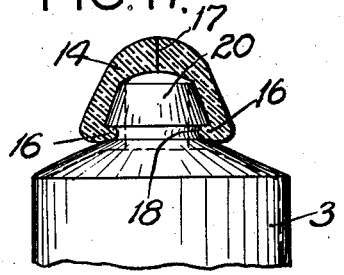
Fig. 17 is a cross section showing a self-straining form of the invention.

In Fig. 17 I show a cap 14 made entirely of soft rubber, the bottom of which has an inwardly projecting shoulder or bead 16 adapted to snap into a groove 18 of the nozzle 20 of the container. The nozzle 20 is preferably tapered as shown, for facilitating snapping on the nozzle 14. The advantage of this construction is that the strains set up in the soft rubber of the nozzle 14 when it is snapped into place serve to tension the slots 17 in a normal closed position so as to insure a definite cut-off after flow of material ceases.

Figure 18:
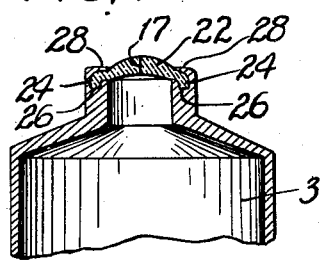
Fig. 18 is a view similar to Fig. 17 showing an alternative of the self-straining form; and, Fig. 19 shows an alternative form of protection cover for the tip, the tip being in elevation and the protective cover in section.

This same general effect may be obtained by means of the structure shown in Fig. 18 wherein the rubber nozzle 22 has an edge 24 placed into a soft-metal groove 26 of the tube outlet. After the diaphragm 22 has been placed, an edge 28 of the groove 26 is spun inwardly to hold the tip 22, and, if desirable, to strain the same to provide the effect above described.

Figure 19:
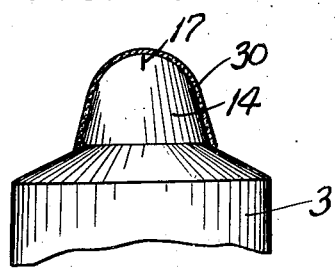

In Fig. 19 I show the form of the invention shown in Fig. 17 with a layer of soluble glue or adhesive 30 thereon, the same having been applied by dipping the tip in said glue. The result is a sealing of the slot 17 during shipment. When the consumer receives the package, it may be held under water and the glue wiped off before using. An example of a suitable adhesive is dextrin having a suitable preservative therein.

An advantage of the modification of Figs. 1 through 11 in general is that the customer using such a tube 3 has a choice as to whether or not he will use the device as an ordinary screw cap with or without the dispensing means 15 and 17. Such a choice is of value to the retailer of a product who, in selling to many different customers, can always please the customers, those who would use the tube 3 without the means 15 and 17 in use and those who would use the tube 3 with diaphragm 15 in use. The value of this is well recognized and leads to more universal use.

Another specific advantage offered by modifications of Figs. 1 and 11 is that a dispensing means 15, 17 has been provided which may be removed from the outlet 7 and replaced in the nozzle 7 at the will of the user. Furthermore a cover as used in these modifications protects the tip 15 from any injury.

Regarding more special advantages offered by the modifications of Figs. 2 and 3, the combining of the diaphragm 15 with the collar 10 simplifies the whole structure and hence is adapted for use for less expensive products. Likewise, in the modifications of Figs. 5 through 7, the simplification has been obtained. It may also be noted that the cork plug 29 provides a highly effective seal for the outlet 7 when the cap 9 is screwed down tightly thereon. Hence, the modifications shown in Figs. 5 through 7 might be used for products which have the tendency to seep. It is also noted that in the modifications of Figs. 1 and 8 through 10, the diaphragm 15 is protected against injury.

Referring now more particularly to Fig. 12 which shows various types of slits or outlets in the diaphragms 15, the slit shown at numeral 39 is adapted to exude a strip of paste or like material 2 which has a relatively square cross section but which has concave sides. Such a strip not only has a sufficiency of paste per unit length of strip but also has a decorative quality that may be used to advantage if the paste 2 is a food which is used to decorate other food dishes.

The slits shown at numerals 41, 43 exude a strip which has a curved cross section and which curls up as it exudes from the tip 15. Such a strip is preferable when the material dispensed from the tube 3 is desired in a globule rather than in a long strip.

At numeral 45, Fig. 12, a slit is shown which exudes a strip having a rectangular cross section and which also curls as described in connection with the slit shown at numerals 43 and 41.

At numeral 47 a slit is shown which has a wave shape cross section. The strip from this slit 17 tends to form a helix as it comes out. Such a strip of dispensed material is, as in the case of the numeral 39 modification, adapted for use in connection with decorative food pastes.

At numeral 49 a type of slit is shown which exudes a strip having a triangular cross section, and which strip tends to curl as it exudes from the tip 15.

At numerals 46 is a W shaped slit and at 48 a Z shaped slit.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A closure for an outlet, said closure comprising a collar formed from relatively rigid material and removably mounted on said outlet, and a dispensing means comprising a resilient diaphragm formed over the top of said collar, said diaphragm having a slit therein and means associated with said collar adapted to seal said diaphragm against pressure of material in said outlet, said last-named means being removable to permit the operation of said slit to dispense material from said outlet and a handle formed on said means adapted to enhance the removal of said means from said collar.

2. In a closure for a receptacle having a threaded outlet, a threaded collar threaded to said outlet, a resilient diaphragm integrally fixed to the outer end of said collar and forming a closure therewith, said diaphragm having a slit therein forming an exit opening for material which is forced from the receptacle, a cover adapted to seal said diaphragm against pressure of material in said outlet, said cover being removable to permit the operation of said diaphragm to dispense material from the opening and having a springing engagement with the collar such that simple pushing and pulling movements of the user will result in permanent attachment and detachment of the cover.

3. In a closure for a receptacle having an outlet, a collar permanently fastened to said outlet, a resilient diaphragm fixed on the outer end of said collar and forming a closure therewith, said diaphragm having a slit therein forming an exit opening for material which is forced from the receptacle, a cover adapted to seal said diaphragm against pressure of material in said outlet, said collar having a groove, and said cover having means snapping into said groove whereby the cover is removable to permit the operation of said diaphragm to dispense material from the opening but is non-removable under pressure within the container.

OSCAR JANSSEN.